United States Patent
Karlqvist et al.

(10) Patent No.: US 9,609,504 B2
(45) Date of Patent: Mar. 28, 2017

(54) NODE AND METHOD FOR MONITORING A VISITOR LOCATION REGISTER REGISTRATION OF A WIRELESS DEVICE

(71) Applicant: Telefonaktiebolaget L M Ericsson (publ), Stockholm (SE)

(72) Inventors: Lars Karlqvist, Lindome (SE); Peter Ramle, Mölnlycke (SE); Mikael Wass, Sätila (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/786,273

(22) PCT Filed: Oct. 8, 2015

(86) PCT No.: PCT/EP2015/073236
§ 371 (c)(1),
(2) Date: Oct. 22, 2015

(87) PCT Pub. No.: WO2016/071068
PCT Pub. Date: May 12, 2016

(65) Prior Publication Data
US 2016/0345158 A1 Nov. 24, 2016

Related U.S. Application Data

(60) Provisional application No. 62/076,521, filed on Nov. 7, 2014.

(51) Int. Cl.
*H04W 4/00* (2009.01)
*H04W 8/06* (2009.01)
*H04W 8/04* (2009.01)
*H04W 8/24* (2009.01)
*H04W 84/04* (2009.01)

(52) U.S. Cl.
CPC ............ *H04W 8/06* (2013.01); *H04W 8/04* (2013.01); *H04W 8/24* (2013.01); *H04W 84/042* (2013.01)

(58) Field of Classification Search
USPC ........................................................ 455/433
See application file for complete search history.

(56) References Cited

PUBLICATIONS

Huawei et al., "HLR update indication for dual VLR registration", 3GPP Draft; C1-122048_29.118_HLR Update Indication for Dual VLR Regisration, 3rd Generation Partnership Project (3GPP), Mobile Competence Centre; 650, Route Des Lucioles; F-06921 Sophia-Antipolis Cedex , France, vol. CT WG1, No. Kyoto, May 21, 2012-May 25, 2012, May 14, 2012, XP050588235, 6 pages.
Teliasonera et al., "SGs Support for MSC in Pool to avoid dual VLR regisration", 3GPP Draft; C1-121763, 3rd Generation Partnership Project (3GPP), Mobile Competence Centre; 650, Route Des Lucioles; F-06921 Sophia-Antipolis Cedex, France, vol. CT WG1, No. Kyoto; May 21, 2012-May 25, 2012, May 11, 2012, XP050587947, 8 pages.

(Continued)

*Primary Examiner* — Joel Ajayi
(74) *Attorney, Agent, or Firm* — Rothwell, Figg, Ernst & Manbeck, P.C.

(57) ABSTRACT

Example embodiments presented herein are directed towards a Mobility Management Entity (MME) and a Visitor Location Register (VLR) node, as well as corresponding methods therein, for monitoring a VLR node registration of a wireless device The MME is currently serving.

14 Claims, 12 Drawing Sheets

(56) References Cited

PUBLICATIONS

"Revisit dual VLR registration problem", 3GPP Draft; C4-121098_Disc-Revisit Dual VLR Registration Problem, 3rd Generation Partnership Project (3GPP), Mobile Competence Centre; 650, Route Des Lucioles; F-06921 Sophia-Antipolis Cedex, France, May 28, 2012, XP050658049, 12 pages.

Ericsson, "Discussion on avoiding dual VLR registration for legacy UEs", 3GPP Draft C1-144391_DualVLR-V3, 3rd Generation Partnership Project (3GPP), Mobile Competence Centre; 650, Route Des Lucioles; F-06921 Sophia-Antipolis Cedex, France, vol. CT WG1, No. San Francisco (CA), USA; Nov. 17, 2014-Nov. 21, 2014, Nov. 10, 2014, XP050883691, 3 pages.

"3rd Generation Partnership Project; Technical Specification Group Core Network and Terminals; Restoration procedures (Release 12)", 3GPP TS 23.007 V12.5.0 (Jun. 2014), 90 pages.

"3rd Generation Partnership Project; Technical Specification Group Services and System Aspects; General Packet Radio Service (GPRS); Service description; Stage 2 (Release 12)", 3GPP TS 23.060 V12.5.0 (Jun. 2014), 347 pages.

"3rd Generation Partnership Project; Technical Specification Group Services and System Aspects; Circuit Switched (CS) fallback in Evolved Packet System (EPS); Stage 2 (Release 12)", 3GPP TS 23.272 V12.3.0 (Jun. 2014), 100 pages.

3rd Generation Partnership Project; Technical Specification Group Core Network and Terminals; Mobility Management Entity (MME)—Visitor Location Register (VLR) SGs interface specification (Release 12), 3GPP TS 29.118 V12.5.0 (Jun. 2014), 72 pages.

"3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)", 3GPP TS 29.274 V12.5,0 (Jun. 2014), 310 pages.

International Search Report and Written Opinion issued in International application No. PCT/EP2015/073236 on Jan. 19, 2016, 13 pages.

NODE AND METHOD FOR MONITORING A VISITOR LOCATION REGISTER REGISTRATION OF A WIRELESS DEVICE

CROSS-REFERENCE TO RELATED APPLICATIONS

This application is a 35 U.S.C. §371 National Phase Entry Application from PCT/EP2015/073236, filed Oct. 8, 2015, and designating the United States, which claims priority to U.S. Provisional Application No. 62/076,521, filed Nov. 7, 2014. The contents of both applications are incorporated by reference.

TECHNICAL FIELD

Example embodiments presented herein are directed towards a Mobility Management Entity (MME) and a Visitor Location Register (VLR) node, and corresponding methods therein, for monitoring a VLR node registration of a wireless device.

BACKGROUND

In a typical cellular system, also referred to as a wireless communications network, wireless terminals, also known as mobile stations and/or user equipment units communicate via a Radio Access Network (RAN) to one or more core networks. The wireless terminals can be mobile stations or user equipment units such as mobile telephones also known as "cellular" telephones, and laptops with wireless capability, e.g., mobile termination, and thus can be, for example, portable, pocket, hand-held, computer-comprised, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "B node" or "Evolved NodeB" or "eNodeB" or "eNB" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies. Long Term Evolution (LTE) together with Evolved Packet Core (EPC) is the newest addition to the 3GPP family.

LTE is a packet based IP network that does not support Circuit Switched (CS) calls. Circuit Switched Fallback (CSFB) is a technology that allows voice services to be delivered to LTE devices through the use of GSM or another CS network. When an LTE device needs to make a voice call, the device 'falls-back' to a 3G or 2G network. During procedures such as CSFB a Mobile Switching Center (MSC) is used to set up, release and route such communications. A Visitor Location Register (VLR) node is in communication with the MSC. The VLR node comprises information regarding wireless devices roaming within a MSC's location area.

SUMMARY

In the presence of a transport network failure, a wireless device may be simultaneously registered to different VLR nodes with only one of the VLRs registering the wireless device in the HLR or HSS. In the presence of a Mobile Terminated (MT) call or MT SMS, this may result in a loss of communication with the wireless device. Thus, a need exists for solving the above mentioned problem.

Thus, the example embodiments presented herein provide a means for monitoring a VLR node registration of a wireless device. An example advantage of some of the example embodiments presented herein is that there are no operational changes introduced to the wireless device. Thus, the example embodiments presented herein may be applied to both legacy and non-legacy wireless devices.

Furthermore, the example embodiments implement a mechanism that will avoid a very serious and possibly long lasting error condition for impacted UEs. The mechanism further corrects the error condition as early as possible and even the first incoming call will not be impacted by additional delays. This is an advantage as correcting the error condition only when an MT call is attempted may increase delay so that the call is lost. The mechanism is not dependent on any particular support in the UE but only requires support in the network providing service. Thus all CSFB supporting UEs will benefit from the invention and it is the only mechanism needed to be deployed by operators to avoid this type of error conditions.

Accordingly, some of the example embodiments are directed towards a method, in a MME, for monitoring a VLR node registration of a wireless device the MME is currently serving. The MME is configured for use in wireless communications network. The method comprises detecting that the wireless device is no longer being served by the MME. The method further comprises sending, to the VLR node, a notification that the VLR node is to re-register the wireless device with a Home Location Register (HLR) or a Home Subscriber Server (HSS). The re-registration is to take place when the wireless device registers with the VLR node via a Long Term Evolution based node.

Some of the example embodiments are directed towards a MME for monitoring a VLR node registration of a wireless device the MME is currently serving. The MME is configured for use in wireless communications network. The MME comprises a detection unit configured to detect that the wireless device is no longer being served by the MME. The MME further comprises a transmitting unit configured to send, to the VLR node, a notification that the VLR node is to re-register the wireless device with a HLR or a HSS. The re-registration is to take place when the wireless device registers with the VLR node via a Long Term Evolution based node.

Some of the example embodiments are directed towards a method, in a VLR node, for monitoring the registration of a wireless device. The VLR node is configured for use in a wireless communications network. The method comprises receiving, from a MME, previously serving the wireless device, a notification that the MME is no longer serving the wireless device. The method further comprises flagging the wireless device as having an unreliable HLR or a HSS registration. The method also comprises receiving a message related to a registration of the wireless device. If the message is received from a Long Term Evolution based node, the method also comprises re-registering the wireless device with the HLR or the HSS, and thereafter reset the flag setting. If the message is received from a 2G or 3G based node, or if the message is a cancel location message, the method further comprises resetting the flag setting.

Some of the example embodiments are directed towards VLR node for monitoring the registration of a wireless device. The VLR node is configured for use in a wireless communications network. The VLR node comprises a receiving unit configured to receive, from a MME previously serving the wireless device, a notification that the MME is no longer serving the wireless device. The VLR node further comprises a flagging unit configured to flag the wireless device as having an unreliable HLR or a HSS registration. The receiving unit is further configured to receive a message related to a registration of the wireless device. If the message is received from a Long Term Evolution based node, a re-registering unit is configured to re-register the wireless device with the HLR or the HSS, and thereafter reset the flag setting. If the message is received from a 2G or 3G based node, or if the message is a cancel location message, a resetting unit is configured to reset the flag setting.

DEFINITIONS

3GPP Third Generation Partnership Project
BSC Base Station Controller
CN Core Network
CS Circuit Switched
CSFB Circuit Switched Fallback
DTM Dual Transfer Mode
E-UTRAN Evolved Universal Terrestrial Radio Access Network
eNB Evolved NodeB
eNodeB Evolved NodeB
EPC Evolved Packet Core
GERAN GSM/EDGE Radio Access Network
GGSN Gateway GPRS Support Node
GPRS General Packet Radio Service
GSM Global System for Mobile Communications
HLR Home Location Register
HSS Home Subscriber Server
ID Identification
IMSI International Mobile Subscriber Identity
LA Location Area
LAI Location Area Identity
LCS Location Services
LTE Long Term Evolution
LU Location Update
MME Mobility Management Entity
MO Mobile Originating
MSC Mobile Switching Center
MT Mobile Terminating
NRI Network Resource Identifier
PCRF Policy Control and Charging Rules Function
PDN Packet Data Network
PGW PDN Gateway
RA Routing Area
RAN Radio Access Network
RAU Routing Area Update
RBS Radio Base Station
RNC Radio Network Controller
SGSN Serving GPRS Support Node
SGW Serving Gateway
SMS Short Message Service
SRVCC Single Radio Voice Call Continuity
TA Tracking Area
TAU Tracking Area Update
TMSI Temporary Mobile Subscriber Identity
UDI Unified Display Interface
UE User Equipment
ULI User Location Information
UMTS Universal Mobile Telecommunications System
USSD Unstructured Supplementary Service Data
UTRAN UMTS Terrestrial Radio Access Network
VLR Visitor Location Register
WCDMA Wideband Code Division Multiple Access

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein. It should be appreciated that the terms user equipment and wireless device may be used interchangeably.

It should further be appreciated that the example embodiments are directed towards a VLR node registration of a wireless device. Thus, in any explanation provided herein, if the term MSC registration or MSC/VLR is used, it is assumed that the VLR is a function provided within the MSC node. It should be appreciated that any of the example embodiments described herein may function on a combined MSC/VLR node or a stand-alone VLR node.

General Overview

Figure 1:
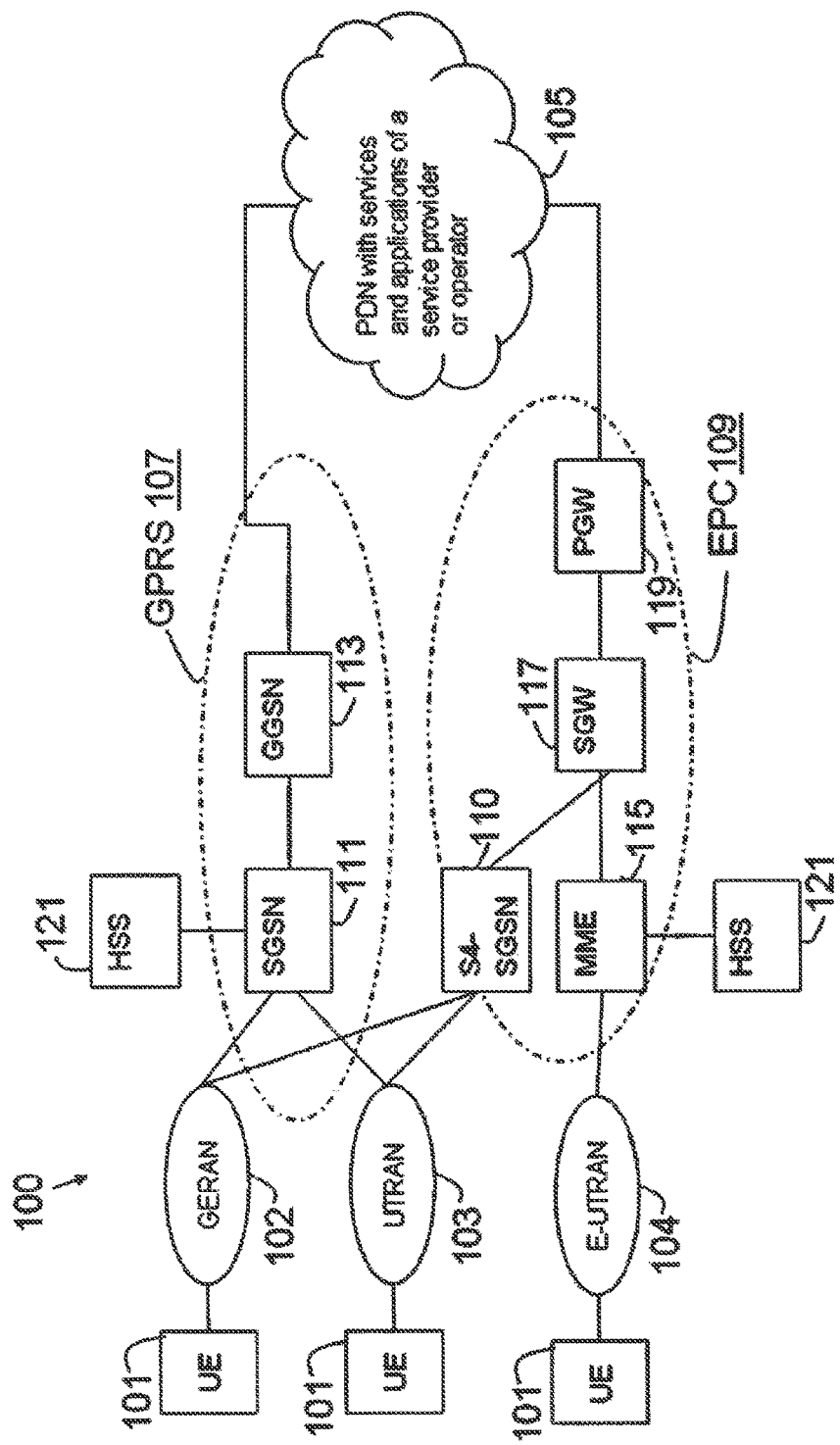
FIGS. 1-3 are illustrated examples wireless networks.

In order to provide a better explanation of the example embodiments presented herein, a problem will first be identified and discussed. FIG. 1 provides a general example of a communication network 100. As shown in FIG. 1, a user equipment (UE) 101 may be in communication with a Universal Terrestrial Radio Access Network (UTRAN) 103, an Evolved UTRAN (E-UTRAN) 104, or a GSM Edge Radio Access Network (GERAN) 102 subsystem in order to access communication to an operator or application server 105. In gaining access to SCS, AS or hosts 105, the UTRAN/E-UTRAN/GERAN subsystem 102-104 may be in communication with a General Packet Radio Service (GPRS) subsystem 107 or an Evolved Packet Core (EPC) subsystem 109. It should also be appreciated that the network may further comprise a WiFi subsystem, although not illustrated in FIG. 1.

The GPRS subsystem 107 may comprise a Serving GPRS Support Node (SGSN) 111, which may be responsible for the delivery of data packets to and from the mobile stations within an associated geographical service area. The SGSN 111 may also be responsible for packet routing, transfer, mobility management and connectivity management. The GPRS subsystem 107 may also include a Gateway GPRS Support Node 113, which may be responsible for the interworking between the GPRS subsystem 107 and the PDN 105.

The EPC subsystem 109 may comprise a Mobility Management Entity 115, which may be responsible for mobility management, connectivity management, idle mode UE tracking, paging procedures, attachment and activation procedures, and small data and message transfer. The EPC subsystem may also comprise a Serving Gateway (SGW) 117, which may be responsible for the routing and forwarding of data packets. The EPC subsystem may also include a Packet data network Gateway (PGW) 119, which may be responsible for providing connectivity from the user equipment 101 to one or more PDN(s) 105. Both the SGSN 111 and the MME 115 may be in communication with a Home Subscriber Server (HSS) 121, which may provide device identification information, an International Mobile Subscriber Identity (IMSI), subscription information, etc. It should be appreciated that the EPC subsystem 109 may also comprise a S4-SGSN 110, thereby allowing the GERAN 102 or UTRAN 103 subsystems to be accessed when the GPRS 107 is replaced by the EPC 109.

A User Equipment (UE) may interact with EPS using the Evolved Universal Terrestrial Radio Access Network (E-UTRAN) radio access. UE-related control signalling is handled by Mobility Management Entity (MME) with support of subscription information provided by the Home Subscriber Server (HSS). User payload is handled by the Serving Gateway (S-GW) and the PDN Gateway (P-GW).

The P-GW may interact with a Policy and Charging Rules Function (PCRF). Registration for the CS domain is performed by MME and MSC/VLR by interaction at the interface SGs. SRVCC is handled over the Sv interface.

The 3GPP network may be organized using multiple MMEs serving the same tracking areas of an LTE radio network and multiple SGSNs serving the same routing areas of a GERAN/UTRAN radio network. These architecture options are named MME Pool and SGSN Pool respectively. Likewise it is possible to organize multiple MSC/VLRs serving the same location areas of a GERAN/UTRAN radio network, then named as MSC pool. In the following text MSC/VLR, MSC or VLR may be used to denote an MSC/VLR.

Figure 2:
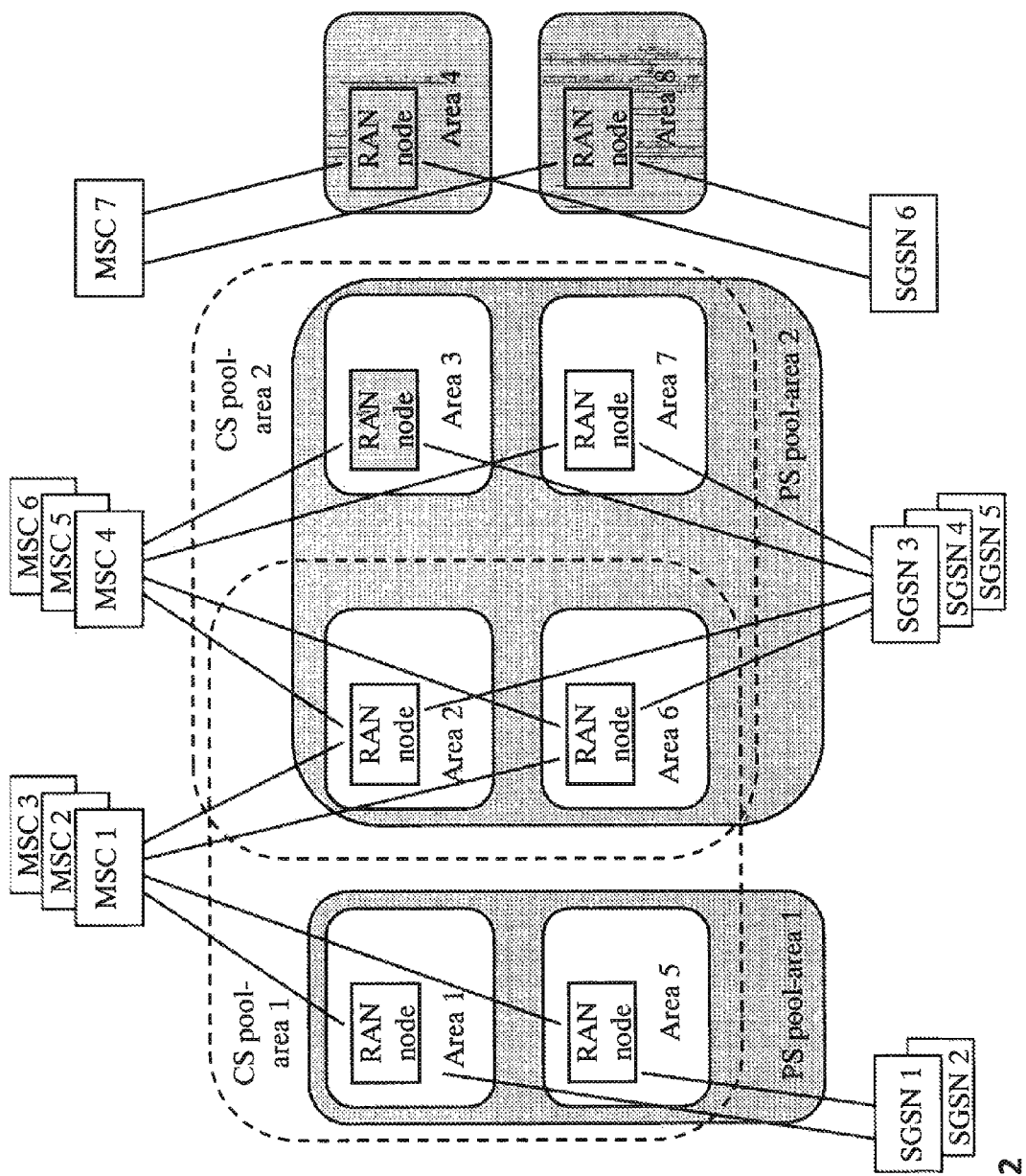
Figure 3:
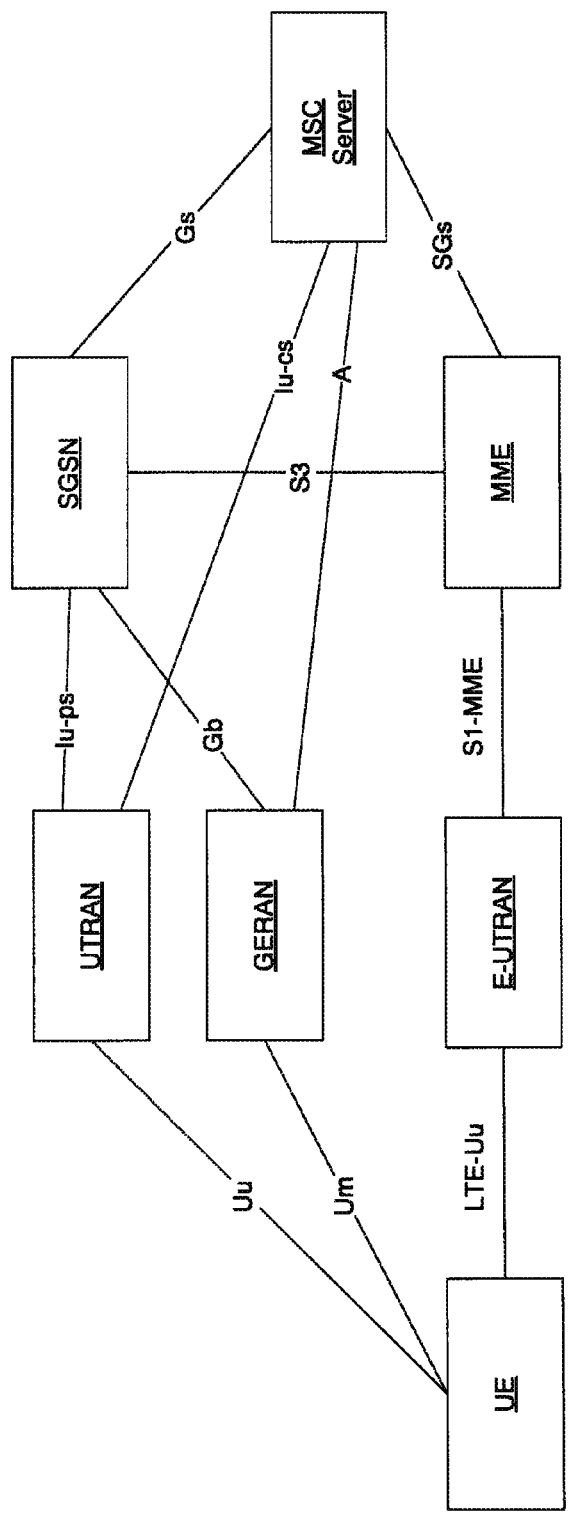

An MSC or an MSC pool could also be connected to one or several MMEs via the SGs interface. This enables provisioning of voice and other CS-domain services (e.g. CS UDI video/LCS/USSD) by reuse of CS infrastructure when the UE is served by E UTRAN. See FIGS. 2 and 3.

Figure 4:
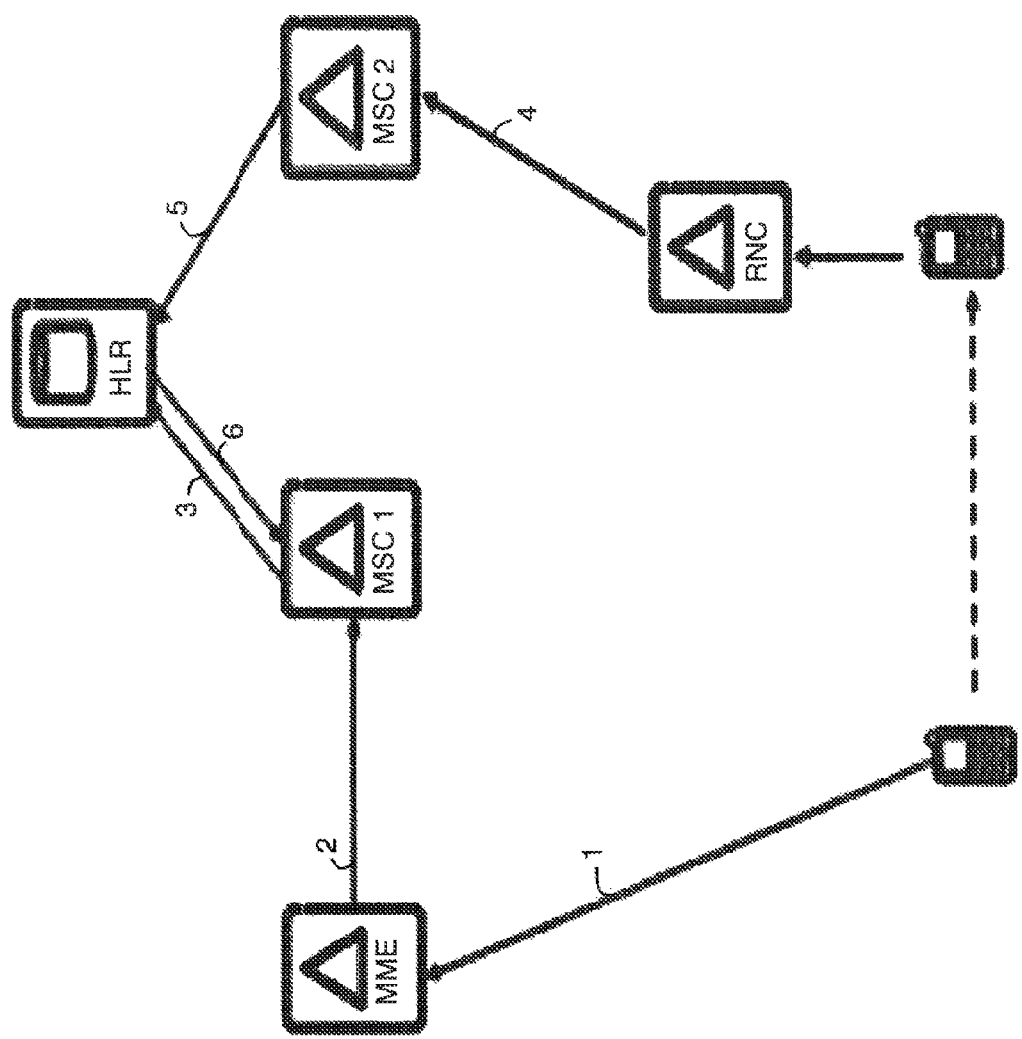
FIG. 4 is a message flow diagram of a location update change of a MSC/VLR.

In the example provided by FIG. 4, the UE has done a (1) combined registration via the MME by sending a Combined TA/LA Update. The combined registration is further performed via the SGs interface by sending a Location Update Request to the MSC1 (2). The UE will thus be registered in MSC1 and the HLR will be updated via the MSC1 sending an Update Location message to the HLR (3).

The UE will be able to receive paging for Mobile Terminating call as these requests are routed from the HLR via MSC1 and MME to the UE. At CSFB the UE may turn up in another LA compared to the LA used at registration over SGs. The UE will then perform a LU via the RNC sending a Location Update request and if the new LA is not served by MSC1 a new MSC, MSC2 will be used (4). The UE will be registered in MSC2 and the HLR will be updated via MSC2 sending a Update Location message to the HLR (5).

As a consequence the HLR will send a Cancel Location message to the old serving MSC1 (6). Any subsequent MT Call will thus be routed via MSC2 but if the UE returns to LTE a new combined registration will be performed and the UE will similarly be registered in MSC1. After that any MT Call paging will be routed from the HLR via MSC1 and MME.

However if MSC1 and MSC2 was part of the same MSC pool then even if the UE turned up in a new LA the new LA would be served also by MSC1 and no change of MSC would occur.

Overview of the Example Embodiments

The current solution works very well as long as there is no problem with the communication towards the involved MSCs. However, when registered MSC/VLR encounters a transport network failure such that the communication towards MME (over SGs), towards RAN (BSC/RNC) and/or towards the HLR, fails then a long lasting problem occur that is not corrected by just fixing the transport network failure. The error case relates also a situation where a UE originally is associated to VLR1 when there is a transport network failure resulting in a break in the communication over SGs between the MME and the VLR1, as well as a break in communication between HLR/HSS and VLR1. In this case the UE turns to 2G or 3G due to, for example, MO Call and CSFB. Selection of serving VLR is done by the RAN as no Gs interface is in use and VLR2 is selected. It shall be noted that as the selection mechanisms in MME and RAN are unsynchronized different VLR may be selected by MME and RAN for the same UE. The HLR/HSS will be updated by VLR2 and paging for MT Call will work fine (HLR/HSS→VLR2→MME→UE). However, later on when the communication towards VLR1 is restored and the UE returns to LTE (e.g., due to Call finished) it makes a new TA/LA Update and MME will re-select VLR1. And as the UE registration in VLR1 remains (Cancel location from HLR/HSS did not reach VLR1 due to the transport network failure) there will be no update from VLR1 towards the HLR/HSS. Consequently, future MT Call paging will be directed from HLR/HSS towards VLR2 and thus not reach the UE.

The result is that all terminating traffic fails and there is no automatic network recovery. Operator has to take manual actions to overcome the problem. It shall also be noted that the duration of the problem could be very long. The problem is not corrected just by fixing the transport network failure. What is required is that some MSC/VLR for each affected UE makes an update towards the HLR/HSS and this normally only occurs when the UE changes MSC/VLR. With the use of an MSC pool normal mobility within the pool area will not cause an MSC/VLR change. MT call will not reach the UE so this is not a trigger for MSC/VLR change. And a mobile originating call shall normally be addressed to the serving MSC/VLR (routing based on NRI in TMSI) so this will neither change serving MSC/VLR. What is required is IMSI Detach from the UE but as the UE is unaware of the problem this is not very likely.

Accordingly, the example embodiments presented herein are directed towards a means of monitoring a VLR node registration of a wireless device that will account for the transport network failures described above. An example advantage of some of the example embodiments is that no modifications are made to the wireless device. Therefore, the example embodiments may be applied to both legacy and non-legacy devices.

According to some of the example embodiments, the MME, if possible, will inform the associated VLR node when the UE leaves the MME. This makes it possible for the associated VLR node to take proper action when the UE returns to that VLR node. The action depends on what information/actions has reached the VLR node in the meantime. If in the meantime there is no Cancel Location for the UE or if the UE hasn't been registered via another node (BSC, RNC or SGSN) then the VLR node needs to update the HLR/HSS.

On the other hand, if it is not possible to contact the associated VLR node when the UE leaves the MME then this is an indication of a transport network failure, which also may have affected the communication between the VLR node and the HLR/HSS. In this case the MME needs to store this information (i.e., an indication of a transport network failure towards the VLR node), either internally as long as UE context remains in MME (as in the case of CSFB to GSM no-DTM) or via the Context Req/Resp/Ack procedure in another CN node.

Later on when the UE returns to LTE, the MME receiving the registration attempt from the UE, will either already have the required information or get it as part of the Context Req/Resp/Ack procedure. The information contains an ID about the previously associated VLR node and its suspected communication problem towards the HLR/HSS. As a consequence, the VLR node shall be informed to issue an update location message to the HLR/HSS. The consequence is that any subsequent MT Call will be directed to the VLR node that has the UE registered. This will make it possible to page the UE for the MT Call.

Depending on when the transport network failure occurs and the severity of the failure it might be possible for MME to contact the associated VLR node while it is still impossible to register the UE via the 2G/3G RAN (or SGSN in case of Gs i/f) and also while it is impossible to send a Cancel Location message to the VLR node. This gives two cases, MME can contact the associated VLR node and MME cannot contact the associated VLR node.

Example Embodiments where the MME is Able to Contact the Associated VLR Node

Figure 5:
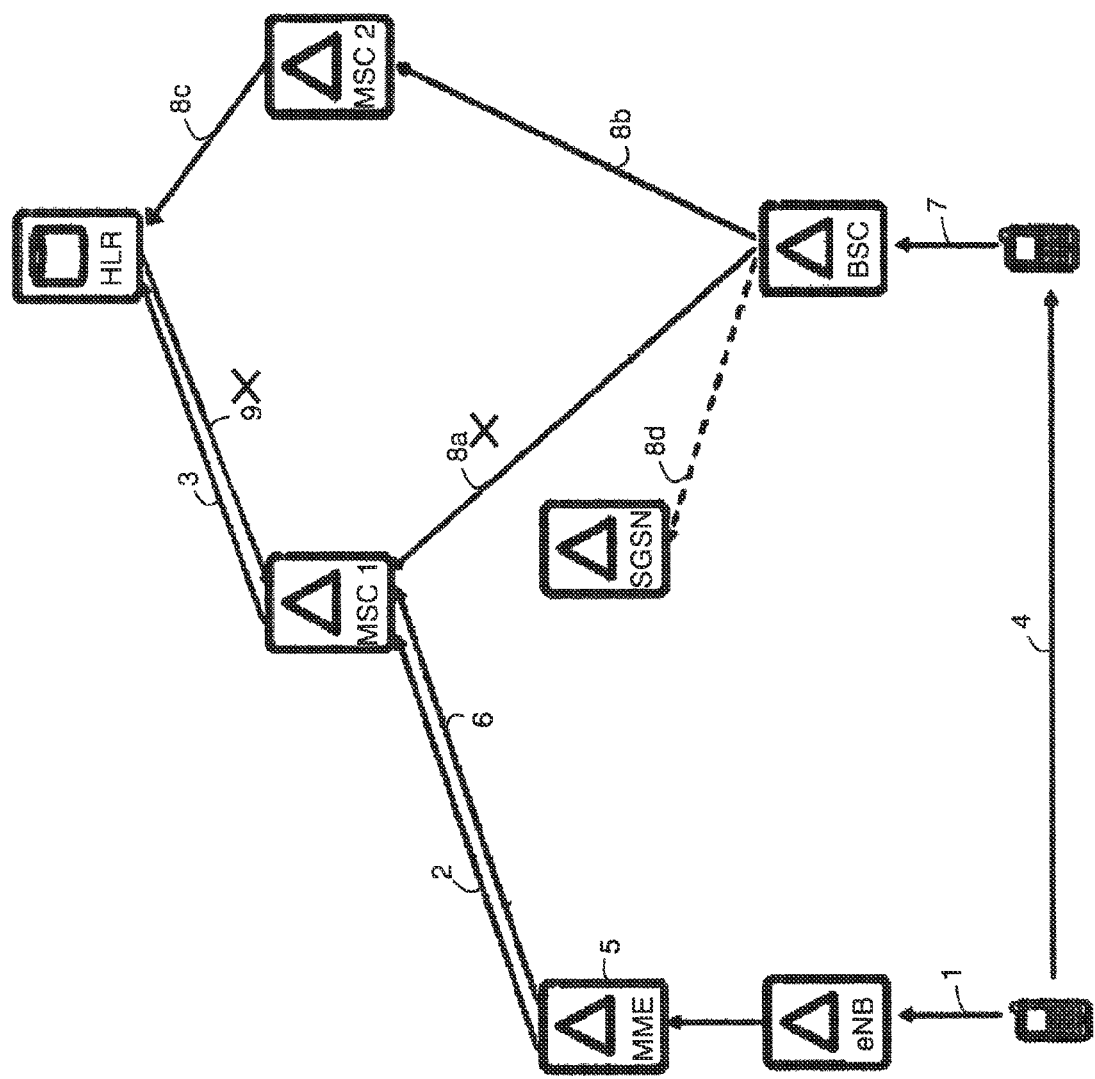
FIGS. 5 and 6 are example message and operation flow diagrams, according to some of the example embodiments presented herein.

Example embodiments under this subheading are illustrated in FIG. 5.

1. At start the UE makes a combined registration in MME and via eNB via sending a Combined TA/LA Update request to the eNB.

2. Via the SGs interface and the LU procedure the UE becomes registered in MSC1 via the MME sending a Location Update Request to MSC1.

3. MSC1 makes a registration of the UE in the HLR/HSS via MSC1 sending an Update Location message to the HLR/HSS.

4. The UE leaves MME, for example, due to MO CSFB or cell reselection into 2G or 3G.

5. MME discovers that the UE has left the node (in this example it is for 2G or 3G but the UE may as well go to another eNB served by another MME).

6. MME informs the MSC1 that the UE has left the MME and that the HLR/HSS registration shall be considered as unreliable. As soon as Cancel Location is received from the HLR/HSS or as soon as the UE get registered via another node (BSC, RNC or SGSN) the 'unreliable flag' shall be removed.

7. The UE makes a registration attempt via a BSC or RNC. Not shown in FIG. 5 is the case when this is a combined RA/LA Update. For that case the SGSN will select serving MSC via the Gs interface.

8a. The BSC/RNC will primarily select MSC1 (routing based on NRI in TMSI) but MSC1 is unreachable due to the transport network failure.

8b. The BSC/RNC selects another MSC, MSC2 and a Location Update request is sent to MSC2.

8c. MSC2 makes an update towards HLR/HSS to get the UE registered by sending an Update Location message.

8d. A RAU request will be sent by the UE in case of GSM DTM or WCDMA, and for GSM no-DTM the RAU request will be sent once the UE enters Idle mode for the CS domain.

9. The HLR/HSS is unable to send Cancel Location to MSC1 due to the transport network failure.

In this situation the UE will from the HLR/HSS point of view be registered in MSC2 but both MSC1 and MSC2 consider the UE as registered in their respective node. However, MSC1 is aware of that its HLR/HSS registration for the UE shall be considered as unreliable.

Example Embodiments where the MME is Unable to Contact the Associated VLR Node

Figure 6:
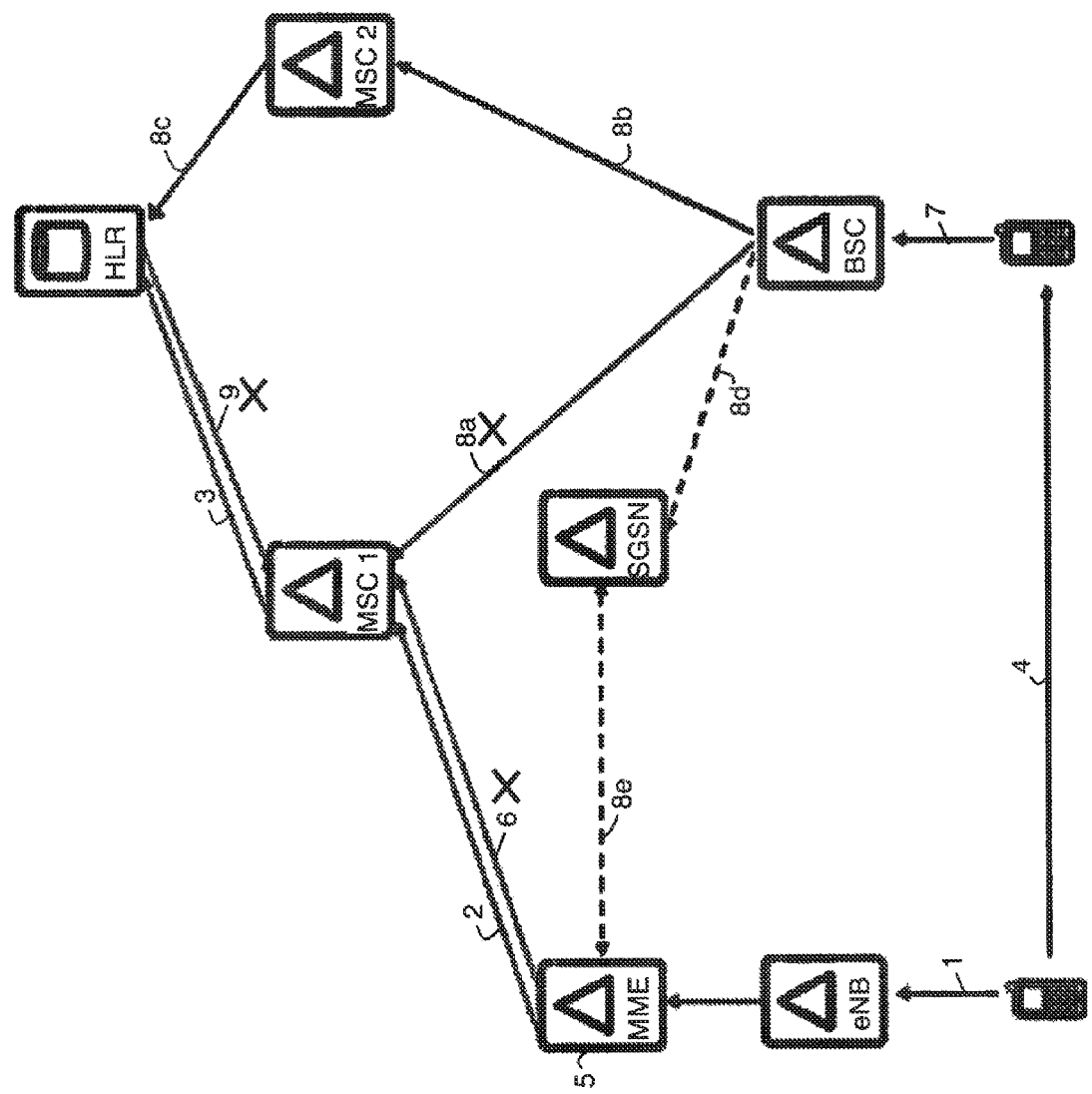

Example embodiments under this subheading are illustrated in FIG. 6.

1-5. Same as described in the previous subheading.

6. MME tries to inform the MSC1 that the UE has left the MME and that the HLR/HSS registration shall be considered as unreliable. Due to the transport network failure this is however not possible. As a consequence the MME notes the MSC ID and that its HLR/HSS registration is considered as unreliable.

7-8d. Same as described in the previous subheading.

8e. In case SGSN receives a RAU request (step 8d) the context information for the UE will be fetched from MME by use of the Context Request/Response/Acknowledge procedure. Within this context information MME includes MSC ID and an indication that its HLR/HSS registration is considered as unreliable.

The SGSN will store this information and provide it to any node asking for the UE's context.

9. Same as described in the previous subheading.

In this situation the UE will from the HLR/HSS point of view be registered in MSC2 but both MSC1 and MSC2 consider the UE as registered in their respective node. MSC1 is not aware of that its HLR/HSS registration for the UE shall be considered as unreliable. Information about that is however stored in the UE's context.

Example Embodiments Regarding the UE's Return to LTE

When the UE returns to LTE it could either be via the original MME or via another MME. Regardless of which, the MME will either use its stored UE context or fetch UE context from the old serving node and if the context includes an MSC ID together with an indication that the MSC's HLR/HSS registration for the UE shall be considered as unreliable then the MME shall use a non-Broadcast (NB) LAI at the Location Update towards the MSC.

If however the MME has been able to contact the MSC then either the MSC still has the UE's HLR/HSS registration indicated as unreliable or the indication has been reset. In the latter case it means that the MSC and the HLR/HSS anyway is synchronized. If the indication remains then the MSC shall make an Update Location towards the HLR/HSS and by that the problem is resolved.

Example Node Configurations

Figure 7:
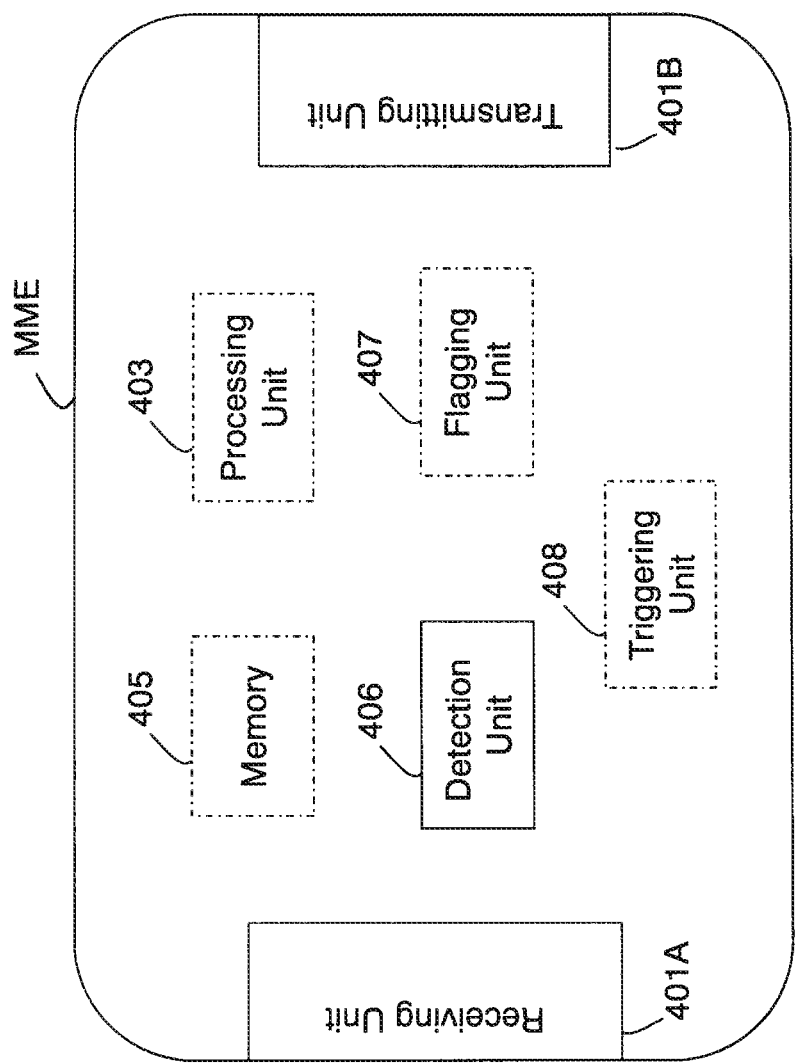
FIG. 7 is an example node configuration of a MME, according to some of the example embodiments presented herein.

FIG. 7 illustrates an example node configuration of a MME. The MME may perform some of the example embodiments described herein. The MME may comprise a receiving unit 401A and a transmitting unit 401B. The receiving and transmitting units may be in the form of radio circuitry, a module, or a communication port that may be configured to receive and/or transmit communication data, instructions, and/or messages. It should be appreciated that the receiving and transmitting units may be comprised as any number of transceiving, receiving, and/or transmitting units, modules, or circuitry. It should further be appreciated that the receiving and transmitting units may be in the form of any input or output communications port known in the art. The receiving and transmitting units may comprise RF circuitry and baseband processing circuitry (not shown).

The MME may also comprise a processing unit, module or circuitry 403 which may be configured to monitor a VLR node registration of a wireless device as described herein. The processing unit 403 may be any suitable type of computation unit, for example, a microprocessor, digital signal processor (DSP), field programmable gate array (FPGA), or application specific integrated circuit (ASIC), or any other form of circuitry. The MME may further comprise a detection unit 406, a flagging unit 407 and a triggering unit 408. It should be appreciated that such units may be comprised within the processing unit as a single unit or as any number of separate units. See the non-limiting summary of some of the example embodiments for a further description of the detection unit 406, the flagging unit 407 and the triggering unit 408.

The MME may further comprise a memory unit, module, or circuitry 405 that may be any suitable type of computer readable memory and may be of volatile and/or non-volatile type. The memory 405 may be configured to store received, transmitted, and/or measured data, device parameters, communication priorities, registration information and/or executable program instructions.

Figure 8:
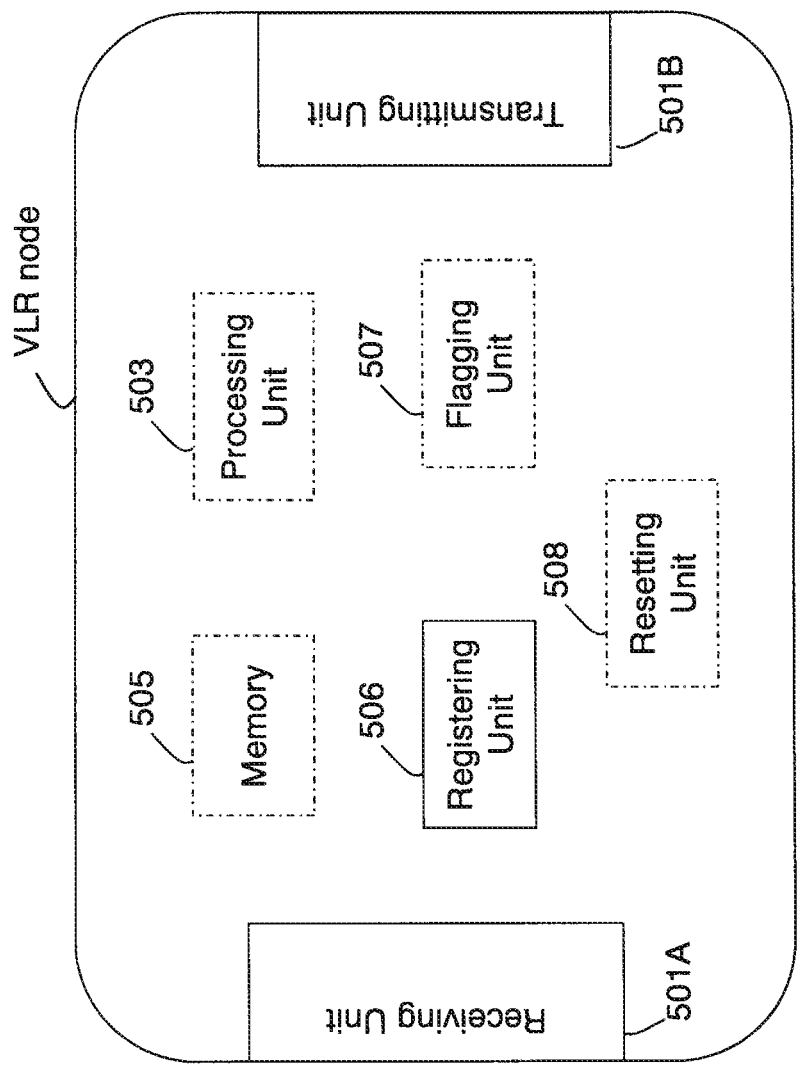
FIG. 8 is an example node configuration of a VLR node, according to some of the example embodiments presented herein.

FIG. 8 illustrates an example node configuration of a VLR node. The VLR node may perform some of the example embodiments described herein. The VLR node may comprise a receiving unit 501A and a transmitting unit 501B. The receiving and transmitting units may be in the form of radio circuitry, a module, or a communication port that may be configured to receive and/or transmit communication data, instructions, and/or messages. It should be appreciated that the receiving and transmitting units may be comprised as any number of transceiving, receiving, and/or transmitting units, modules, or circuitry. It should further be appreciated that the receiving and transmitting units may be in the form of any input or output communications port known in the art. The receiving and transmitting units may comprise RF circuitry and baseband processing circuitry (not shown).

The VLR node may also comprise a processing unit, module or circuitry 503 which may be configured to monitor a VLR node registration of a wireless device as described herein. The processing unit 503 may be any suitable type of computation unit, for example, a microprocessor, digital signal processor (DSP), field programmable gate array (FPGA), or application specific integrated circuit (ASIC), or any other form of circuitry. The VLR node may further comprise a registering unit 506, a flagging unit 507 and a resetting unit 508. It should be appreciated that such units may be comprised within the processing unit as a single unit or as any number of separate units. See the non-limiting summary of some of the example embodiments for a further description of the registering unit 506, the flagging unit 507 and the resetting unit 508.

The VLR node may further comprise a memory unit, module, or circuitry 505 that may be any suitable type of computer readable memory and may be of volatile and/or non-volatile type. The memory 505 may be configured to store received, transmitted, and/or measured data, device parameters, communication priorities, registration information and/or executable program instructions.

Example Node Operations

Figure 9A:
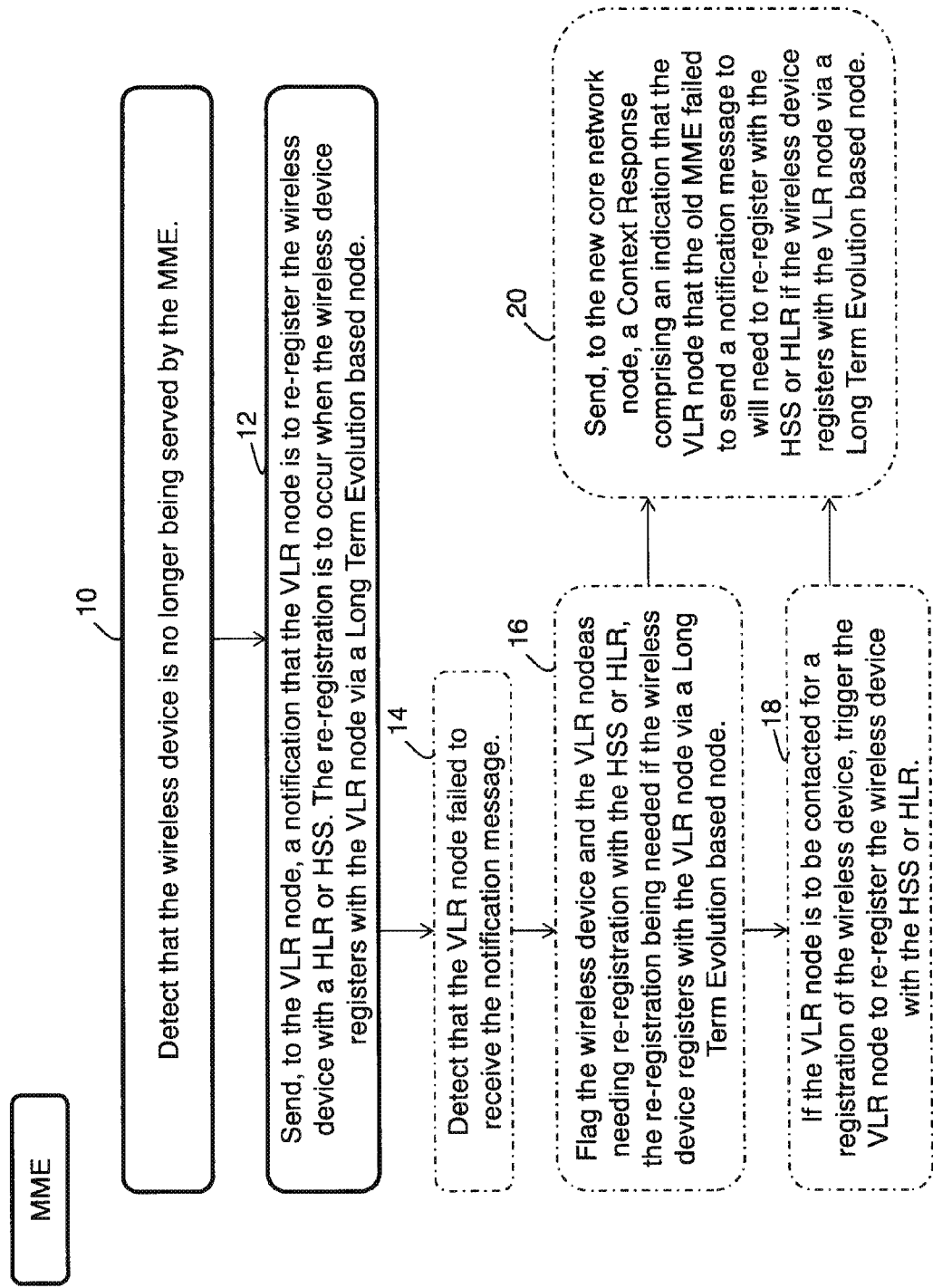
FIGS. 9A and 9B is a flow diagram of example operations, and corresponding modules, respectively, that may be taken by the MME of FIG. 7, according to some of the example embodiments presented herein.

FIG. 9A is a flow diagram depicting example operations that may be taken by a MME as described herein for monitoring a VLR node registration of a wireless device. It should also be appreciated that FIG. 9A comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination. The numerals referred to in FIG. 9A correspond to the numerals referred to in the non-limiting summary of some of the example embodiments.

Figure 9B:
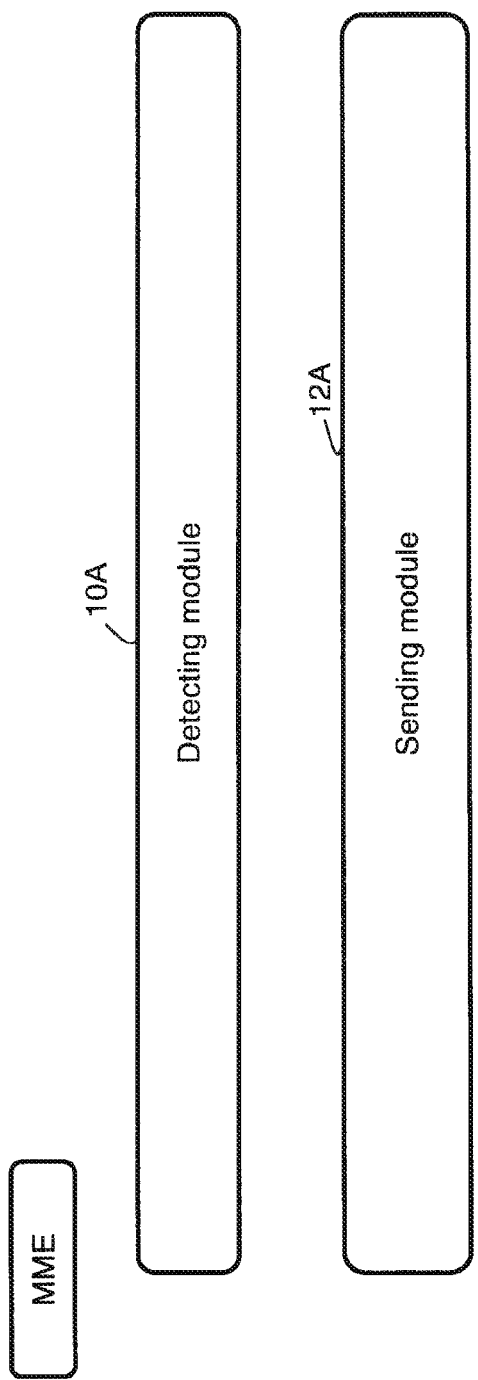

FIG. 9B is a module diagram of various modules that may be utilized in the performance of the operations of FIG. 9A.

Operation 10

The MME is configured to detect 10 that the wireless device is no longer being served by the MME. The detection unit 406 is configured to detect that the wireless device is no longer being served by the MME. The detecting module 10A is configured to perform operation 10.

It should be appreciated that the detecting operation may comprise the MME learning that the MME is no longer serving the wireless device via any message that may be passed during mobility procedures such as, for example, a handover, a TAU, a RAU, any idle mode mobility procedures or a CSFB.

Operation 12

Upon detecting 10, the MME is configured to send 12, to the VLR node, a notification that the VLR node is to re-register the wireless device with a HLR or HSS. The re-registration is to take place when the wireless device registers with the VLR node via a LTE based node. The transmitting unit 401B is configured to send, to the VLR node, the notification. The sending module 12A is configured to perform operation 12.

It should be appreciated that the VLR node may be a stand-alone node or may be a function within a MSC node. It should further be appreciated that the LTE based node described above in the sending operation may be another MME node or the same MME node which performs operations 10 and 12. It should be appreciated that the notification sent in operation 12 comprises an identification of the wireless device, for example, an IMSI. It should also be appreciated that communications described herein between the MME and the VLR node may occur with the assistance of a SGs interface.

Example Operation 14

According to some of the example embodiments, the MME may be further configured to detect 14 that the VLR node failed to receive the notification message. The detecting unit 406 is configured to detect that the VLR node failed to receive the notification message.

It should be appreciated that the detection of the failure to receive the notification message may comprise receiving a failure message, failing to receive an acknowledgement from the VLR node, or the MME being unable to send the notification to the VLR node.

Example Operation 16

Upon the detecting 14, the MME is configured to flag 16 the wireless device and the VLR node as needing re-registration with the HSS or HLR. The re-registration is needed if the wireless device registers with the VLR node via a LTE based node. The flagging unit 407 is configured to flag the wireless device and the VLR node.

It should be appreciated that the flagging may be a setting or notification provided in the MME internally. It should also be appreciated that the LTE based node described above in operation 16 may be another MME node or the same MME node of operations 10 and 12.

Example Operation 18

If the VLR node is to be contacted for a registration of the wireless device, the MME is further configured to trigger 18 the VLR node to re-register the wireless device with the HSS or HLR. The triggering unit 408 is configured to trigger the VLR node.

Example Operation 20

According to some of the example embodiments, the MME is an old MME undergoing a mobility procedure with a new core network node that will serve the wireless device. In such scenarios, the old MME is further configured to send 20, to the new core network node, a context response message comprising an indication that the old MME failed to send a notification message for the VLR node to re-register with the HSS or HLR if the wireless device registers with the VLR node via a LTE based node. The transmitting unit 401B is configured to send, to the new core network node, the context response message.

It should be appreciated that in example operation 20, the LTE based node may be the core network node or any other node, for example, a SGSN in 2G/3G during intermediate handling or a MME, that may receive the indication in a context response message for a later performed mobility procedure.

It should also be appreciated that once the core network node, or a MME which later receives the indication, needs to register the flagged wireless device with the flagged VLR node. The triggering described in relation to example operation 18 will be performed.

According to some of the example embodiments, the context response message comprises an identification of the wireless device. According to some of the example embodiments, the identification is an IMSI.

Figure 10A:
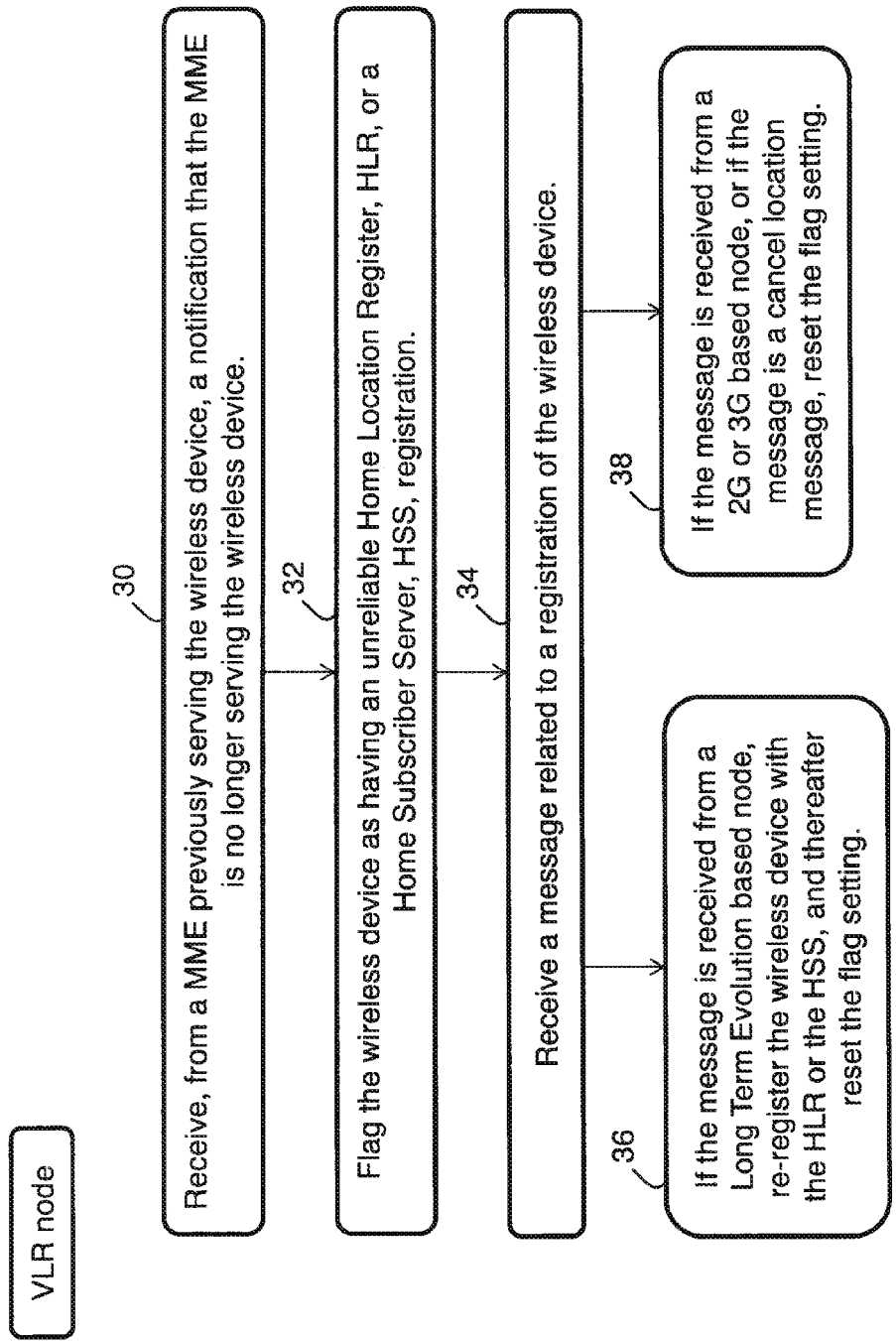
FIGS. 10A and 10B is a flow diagram of example operations, and corresponding modules, respectively, that may be taken by the VLR node of FIG. 8, according to some of the example embodiments presented herein.

FIG. 10A is a flow diagram depicting example operations that may be taken by a VLR node as described herein for monitoring a VLR node registration of a wireless device. It should also be appreciated that FIG. 10A comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination. The numerals referred to in FIG. 9A correspond to the numerals referred to in the non-limiting summary of some of the example embodiments.

Figure 10B:
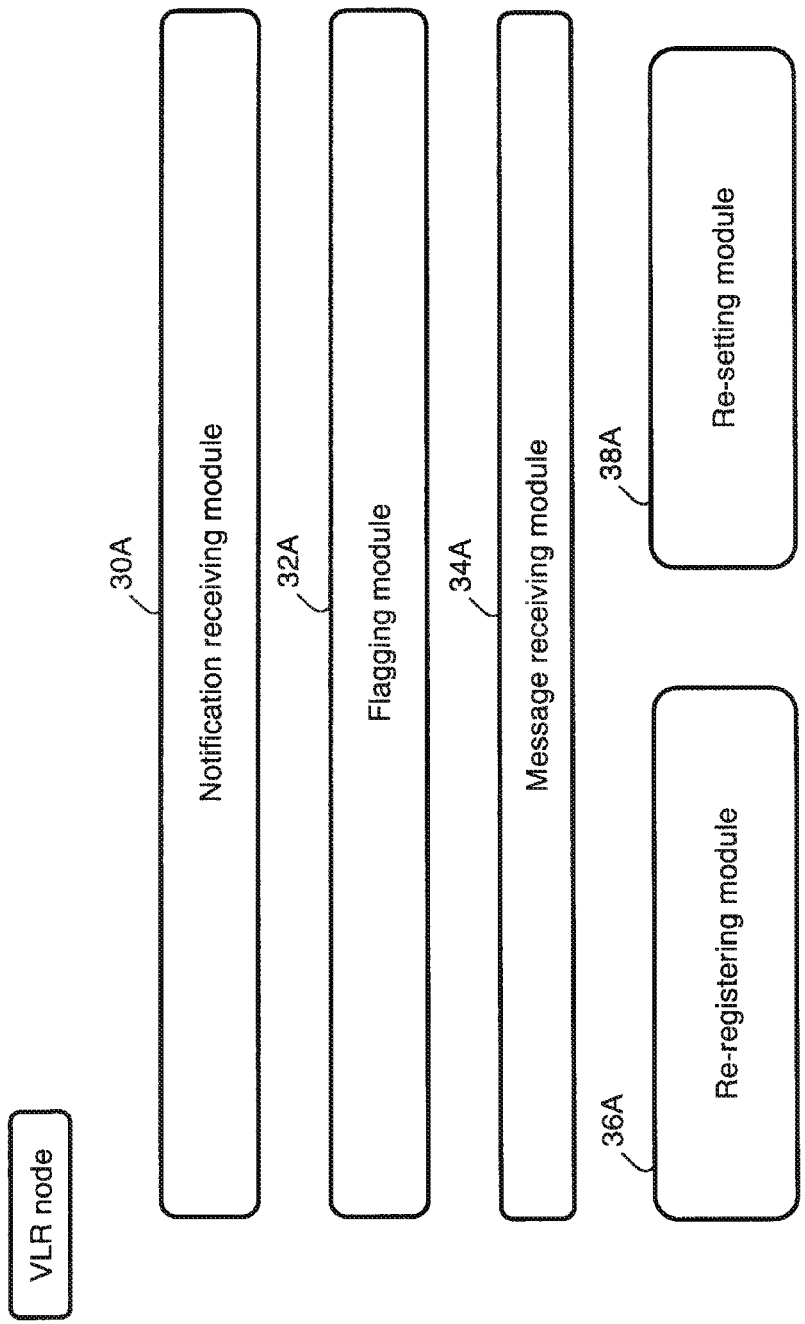

FIG. 10B is a module diagram of various modules that may be utilized in the performance of the operations of FIG. 10A.

Operation 30

The VLR node is configured to receive 30, from a MME previously serving the wireless device, a notification that the MME is no longer serving the wireless device. The receiving unit 501A is configured to receive, from the MME previously serving the wireless device, the notification. The notification receiving module 30A is configured to perform operation 30.

It should be appreciated that the VLR node may be a stand-alone node or may be a function within a MSC node. It should also be appreciated that the notification may comprise an identification of the wireless device, for example, an IMSI.

Operation 32

The VLR node is further configured to flag 32 the wireless device as having an unreliable HLR or HSS registration. The flagging unit 507 is configured to flag the wireless device as having an unreliable HSS or HLR registration. The flagging module 32A is configured to perform operation 32.

It should be appreciated that the flag setting may be an internal setting provided in the VLR node.

Operation 34

The VLR node is also configured to receive 34 a message related to a registration of the wireless device. The receiving unit 501A is configured to receive the message related to the registration of the wireless device. The message receiving module 34A is configured to perform operation 34.

Operation 36

If the message described in operation 24 is received from a LTE based node, the VLR node is further configured to re-register 36 the wireless device with the HLR or the HSS and thereafter reset the flag setting. The re-registering unit 506 is configured to re-register the wireless device with the HLR or the HSS and thereafter reset the flag setting. The re-registering module 36A is configured to perform operation 36.

It should be appreciated that the LTE based node described in operation 36 may be another MME node or the same MME node described in the receive operation 30.

Operation 38

If the message described in operation 24 is received from a 2G or 3G based node, or if the message is a cancel location message, the VLR node is further configured to reset 38 the flag setting. The resetting unit 508 is configured to reset the flag setting. The re-setting module 38A is configured to perform operation 38.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as user equipment should be considered as non-limiting. A device or user equipment as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. It should be appreciated that the term user equipment may also comprise any number of connected devices. Furthermore, it should be appreciated that the term 'user equipment' shall be interpreted as defining any device which may have an internet or network access.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, in a Mobility Management Entity (MME), the method comprising:
    the MME serving a wireless device;
    the MME sending to a Visitor Location Register (VLR) node a first registration message for causing the VLR node to register the wireless device with one of a Home Location Register (HLR) and a Home Subscriber Server (HSS);
    the MME monitoring the VLR node registration of the wireless device, wherein said monitoring comprises:
    the MME detecting that the wireless device is no longer being served by the MME; and
    in response to detecting that the wireless device is no longer being served by the MME, the MME sending, to the VLR node, a notification that the VLR node is to re-register the wireless device with one of the HLR and the HSS when the wireless device re-registers with the VLR node via a Long Term Evolution based node.

2. The method of claim 1, wherein the notification comprises an identification of the wireless device.

3. The method of claim 1, further comprising:
    detecting that the VLR node failed to receive the notification message;
    flagging the wireless device and the VLR node as needing re-registration with the HSS or HLR, the re-registration being needed if the wireless device registers with the VLR node via a Long Term Evolution based node; and
    triggering the VLR node to re-register the wireless device with the HSS or HLR.

4. The method of claim 3, wherein the MME is an old MME undergoing a mobility procedure with a new core network node that will serve the wireless device, the method further comprising:

sending, to the new core network node a context response message comprising an indication that the VLR node that the old MME failed to send a notification message for the VLR node to re-register with the HSS or HLR if the wireless device registers with the VLR node via a Long Term Evolution based node.

5. The method of claim 4, wherein the context response message comprises an identification of the wireless device.

6. A Mobility Management Entity (MME) for monitoring a Visitor Location Register (VLR) node registration of a wireless device the MME is currently serving, the MME comprising:

a transmitter; and a processing unit coupled to the transmitter, wherein the processing unit is configured to:

employ the transmitter to transmit to a Visitor Location Register (VLR) node a first registration message for causing the VLR node to register with one of a Home Location Register (HLR) and a Home Subscriber Server (HSS) a wireless device being served by the MME; and monitor the VLR node registration of the wireless device, wherein the processing unit is configured to monitor the VLR node registration by:

detecting that the wireless device is no longer being served by the MME; and in response to detecting that the wireless device is no longer being served by the MME, employing the transmitter to send, to the VLR node, a notification that the VLR node is to re-register the wireless device with one of the HLR and the HSS when the wireless device re-registers with the VLR node via a Long Term Evolution based node.

7. The MME of claim 6, wherein the notification comprises an identification of the wireless device.

8. The MME of claim 6, wherein the MME is further configured to employ the processing unit to detect that the VLR node failed to receive the notification message, the MME is further configured to flag the wireless device and the VLR node as needing re-registration with the HSS or HLR if the wireless device registers with the VLR node via a Long Term Evolution based node; and the MME is further configured to trigger the VLR node to re-register the wireless device with the HSS or HLR if the VLR node is to be contacted for a registration of the wireless device.

9. The MME of claim 8, wherein the MME is an old MME undergoing a mobility procedure with a new core network node that will serve the wireless device, and the MME is further configured to employ the transmitter to transmit, to the new core network node, a context response message comprising an indication that the VLR node that the old MME failed to send a notification message for the VLR node to re-register with the HSS or HLR if the wireless device registers with the VLR node via a Long Term Evolution based node.

10. The MME of claim 9, wherein the context response message comprises an identification of the wireless device.

11. A method, in a Visitor Location Register (VLR) node, for monitoring the registration of a wireless device, the method comprising:

receiving, from a Mobility Management Entity (MME) previously serving the wireless device, a notification that the MME is no longer serving the wireless device;

flagging the wireless device as having an unreliable Home Location Register (HLR) or a Home Subscriber Server (HSS) registration;

receiving a message related to a registration of the wireless device;

determining whether the message is received from a Long Term Evolution (LTE) based node or from a 2G or 3G based node; and as a result of a) flagging the wireless device as having an unreliable registration and b) determining that the message is received from the LTE based node, re-registering the wireless device with the HLR or the HSS, and resetting the flag setting, wherein the VLR node is configured to reset the flag setting such that the flag setting no longer indicates that the wireless device has an unreliable registration when the message is received from the 2G or 3G node, or when the message is a cancel location message.

12. The method of claim 11, wherein the notification comprises an identification of the wireless device.

13. A Visitor Location Register (VLR) node for monitoring the registration of a wireless device, the VLR node comprising:

a receiving unit configured to receive, from a Mobility Management Entity (MME) previously serving the wireless device, a notification that the MME is no longer serving the wireless device; and a processing unit, wherein the processing unit is configured such that, in response to the receiving unit receiving the notification, the processing unit sets a flag indicating that the wireless device has an unreliable Home Location Register (HLR) or a Home Subscriber Server (HSS) registration;

wherein the processing unit is further configured such that, as a result of the receiving unit receiving a message related to a registration of the wireless device, the processing unit determines whether the message is from a Long Term Evolution (LTE) based node or from a 2G or 3G based node;

wherein the processing unit is further configured such that, as a result of determining that the message is from an LTE based node, the processing unit re-register the wireless device with the HLR or the HSS; and wherein the processing unit is further configured such that, as a result of determining that the message is from a 2G or 3G based node, the processing unit resets the flag such that the flag no longer indicates that the wireless device has an unreliable registration.

14. The VLR node of claim 13, wherein the notification comprises an identification of the wireless device.

\* \* \* \* \*